(12) United States Patent
Jeong et al.

(10) Patent No.: US 12,050,900 B2
(45) Date of Patent: Jul. 30, 2024

(54) METHOD FOR UPDATING APPLICATION AND ELECTRONIC DEVICE OF THE SAME

(71) Applicant: SAMSUNG ELECTRONICS CO., LTD., Suwon-si (KR)

(72) Inventors: Kwanhee Jeong, Suwon-si (KR); Jeongsik Mun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 17/749,700

(22) Filed: May 20, 2022

(65) Prior Publication Data

US 2022/0382534 A1 Dec. 1, 2022

Related U.S. Application Data

(63) Continuation of application No. PCT/KR2022/006220, filed on May 2, 2022.

(30) Foreign Application Priority Data

Jun. 1, 2021 (KR) .................. 10-2021-0070726

(51) Int. Cl.
*G06F 8/65* (2018.01)
(52) U.S. Cl.
CPC ..................... *G06F 8/65* (2013.01)
(58) Field of Classification Search
CPC .......................................................... G06F 8/65
(Continued)

(56) References Cited

U.S. PATENT DOCUMENTS

| 7,584,467 | B2 * | 9/2009 | Wickham | .................. G06F 8/65 717/176 |
| 7,584,473 | B2 * | 9/2009 | Forin | ..................... G06Q 40/00 718/100 |

(Continued)

FOREIGN PATENT DOCUMENTS

| KR | 10-2007-0024812 A | 3/2007 |
| KR | 10-1072348 B1 | 10/2011 |

(Continued)

OTHER PUBLICATIONS

Schneidewind, Norman F. "Modelling the fault correction process." Proceedings 12th international symposium on software reliability engineering. IEEE, 2001.pp.185-190 (Year: 2001).*

(Continued)

*Primary Examiner* — Satish Rampuria
(74) *Attorney, Agent, or Firm* — Sughrue Mion, PLLC

(57) ABSTRACT

An electronic device may include a memory, a communication circuit, and a processor configured to be operatively connected to the memory and the communication circuit, wherein the processor may be configured to: receive an update package of a first application from a server through the communication circuit, based on a request to update the first application; identify at least one application related to execution of the first application; identify whether at least one of the first application or the related at least one application is currently being executed; and based on identifying that the at least one of the first application or the related at least one application is currently being executed, store the update package in the memory, and delay updating the first application by using a timer.

20 Claims, 13 Drawing Sheets

(58) Field of Classification Search
USPC .................................................. 717/120–178
See application file for complete search history.

(56) References Cited

U.S. PATENT DOCUMENTS

| | | | |
|---|---|---|---|
| 8,448,162 B2* | 5/2013 | Ramanathan | G06F 8/61 |
| | | | 717/176 |
| 9,727,124 B2 | 8/2017 | Lee et al. | |
| 9,959,107 B2 | 5/2018 | Park et al. | |
| 10,579,360 B2 | 3/2020 | VanBlon et al. | |
| 10,732,954 B2 | 8/2020 | Bala et al. | |
| 2003/0093485 A1* | 5/2003 | Dougall | H04L 12/1868 |
| | | | 709/208 |
| 2007/0050733 A1* | 3/2007 | Lee | H04N 21/47214 |
| | | | 715/825 |
| 2011/0002228 A1* | 1/2011 | Pepper | H04L 43/50 |
| | | | 370/250 |
| 2012/0329442 A1* | 12/2012 | Luft | H04W 74/0833 |
| | | | 455/418 |
| 2015/0007157 A1* | 1/2015 | Park | G06F 8/65 |
| | | | 717/170 |
| 2015/0007255 A1 | 1/2015 | Kim | |

FOREIGN PATENT DOCUMENTS

| | | |
|---|---|---|
| KR | 10-2012-0131402 A | 12/2012 |
| KR | 10-2013-0074742 A | 7/2013 |
| KR | 10-2015-0008957 A | 1/2015 |
| KR | 10-2015-0057328 A | 5/2015 |
| KR | 10-2124330 B1 | 6/2020 |
| KR | 10-2255952 B1 | 5/2021 |

OTHER PUBLICATIONS

Wang, Long, et al. "Reliability microkernel: Providing application-aware reliability in the os." IEEE Transactions on Reliability 56.4 (2007): pp. 597-614. (Year: 2007).*

Bondavalli, Andrea, et al. "Dependability modeling and evaluation of multiple-phased systems using DEEM." IEEE Transactions on Reliability 53.4 (2004): pp. 509-522. (Year: 2004).*

Marathe, Virendra J., William N. Scherer III, and Michael L. Scott. "Adaptive software transactional memory." International Symposium on Distributed Computing. Berlin, Heidelberg: Springer Berlin Heidelberg, 2005.pp. 354-368 (Year: 2005).*

Balasubramanian, Aruna, Ratul Mahajan, and Arun Venkataramani. "Augmenting mobile 3G using WiFi." Proceedings of the 8th international conference on Mobile systems, applications, and services. 2010.pp.209-222 (Year: 2010).*

Cooper, Gregory H., and Shriram Krishnamurthi. "Embedding dynamic dataflow in a call-by-value language." European symposium on programming. Berlin, Heidelberg: Springer Berlin Heidelberg, 2006.pp.294-308 (Year: 2006).*

Communication dated Aug. 5, 2022, issued by the International Searching Authority in counterpart International Application No. PCT/KR2022/006220 (PCT/ISA/210).

Communication dated Aug. 5, 2022, issued by the International Searching Authority in counterpart International Application No. PCT/KR2022/006220 (PCT/ISA/237).

* cited by examiner

METHOD FOR UPDATING APPLICATION AND ELECTRONIC DEVICE OF THE SAME

CROSS-REFERENCE TO RELATED APPLICATION(S)

This application is a by-pass continuation application of International Application No. PCT/KR2022/006220, filed May 2, 2022, which claims priority from Korean Patent Application No. 10-2021-0070726, filed on Jun. 1, 2021 in the Korean Intellectual Property Office, and all the benefits accruing therefrom under 35 U.S.C. 119, the disclosures of which are herein incorporated by reference in their entireties.

BACKGROUND

1. Technical Field

Various embodiments disclosed herein relate to a method for updating application and an electronic device of the same.

2. Description of the Related Art

An electronic device may include an operating system (OS) for controlling one or more resources and an application executable in the operating system.

An electronic device may update an application installed in the electronic device through various application stores (hereinafter, "app store", e.g., Google Play™ store) operated by a server. The electronic device may download an update package (e.g., an installation file (e.g., a *.apk file)) from an app store to update an application.

When updating an application, an electronic device may terminate the updated application in a previous version if the application is operating, may install the application, based on an update package downloaded from an app store, and may delete an update package in the previous version when the application is completely installed.

When an application update is performed while an application in a previous version is operating in an electronic device, the operating application in the previous version is terminated and the operation of the application is restricted so that the application cannot be executed. When an update package is completely installed, the restricted operation is released, and the updated application is allowed to be executed. Accordingly, when the application update is performed, the application being used by a user may be forcibly terminated, and the user may not be able to use the application for a considerable time until the update is completed. Further, during an update process of the application, another application related to execution of the application may also be terminated and an operation of the another application may be restricted.

Various embodiments of the disclosure provide a method for performing an update of an application in consideration of the operating state of the application when an electronic device updates the application, and an electronic device therefor.

Various embodiments of the disclosure provide a method for identifying a dependent application of an application that is to be updated and performing an update of the application in consideration of the operating state of the dependent application when an electronic device updates the application, and an electronic device therefor.

Technical aspects to be achieved in the disclosure are not limited to the technical aspects mentioned above, and other technical aspects not mentioned will be clearly understood by those skilled in the art from the following description.

SUMMARY

According to an aspect of an example embodiment, provided is an electronic device including: a memory, a communication circuit, and a processor configured to be operatively connected to the memory and the communication circuit, wherein the processor may be configured to: receive an update package of a first application from a server through the communication circuit, based on a request to update the first application; identify at least one application related to execution of the first application; identify whether at least one of the first application or the related at least one application is currently being executed; and based on identifying that the at least one of the first application or the related at least one application is currently being executed, store the update package in the memory, and delay updating the first application by using a timer.

According to an aspect of an example embodiment, provided is a method for operating an electronic device, including: receiving an update package of a first application from a server, based on a request to update the first application; identifying at least one application related to execution of the first application; identifying whether the at least one of the first application or the related at least one application is currently being executed; and based on identifying that the at least one of the first application or the related at least one application is currently being executed, temporarily storing the update package in a memory and delaying updating the first application by using a timer.

According to various embodiments disclosed herein, when an application that is currently being executed in an electronic device is to be updated, an operating state of the application may be identified and updating the application may be delayed based on the operating state, thereby avoiding inconvenience of forcibly terminating the application in use or not allowing use of the application for a certain time during an update process of the application.

According to various embodiments disclosed herein, when a dependent application that is dependent on an application to be updated is currently being executed in an electronic device, the operating state of the dependent application may be identified and updating the application may be delayed based on the operating state of the dependent application, thereby avoiding inconvenience of forcibly terminating the dependent application in use or not allowing use of the dependent application for a certain time during an update process of the application.

In addition, various effects directly or indirectly identified through this document may be provided.

BRIEF DESCRIPTION OF THE DRAWINGS

The above and other objects and features of the disclosure will become apparent by describing in detail embodiments thereof with reference to the accompanying drawings. In describing the drawings, the same or like reference numerals may be used to refer to the same or like elements.

DETAILED DESCRIPTION

Figure 1:
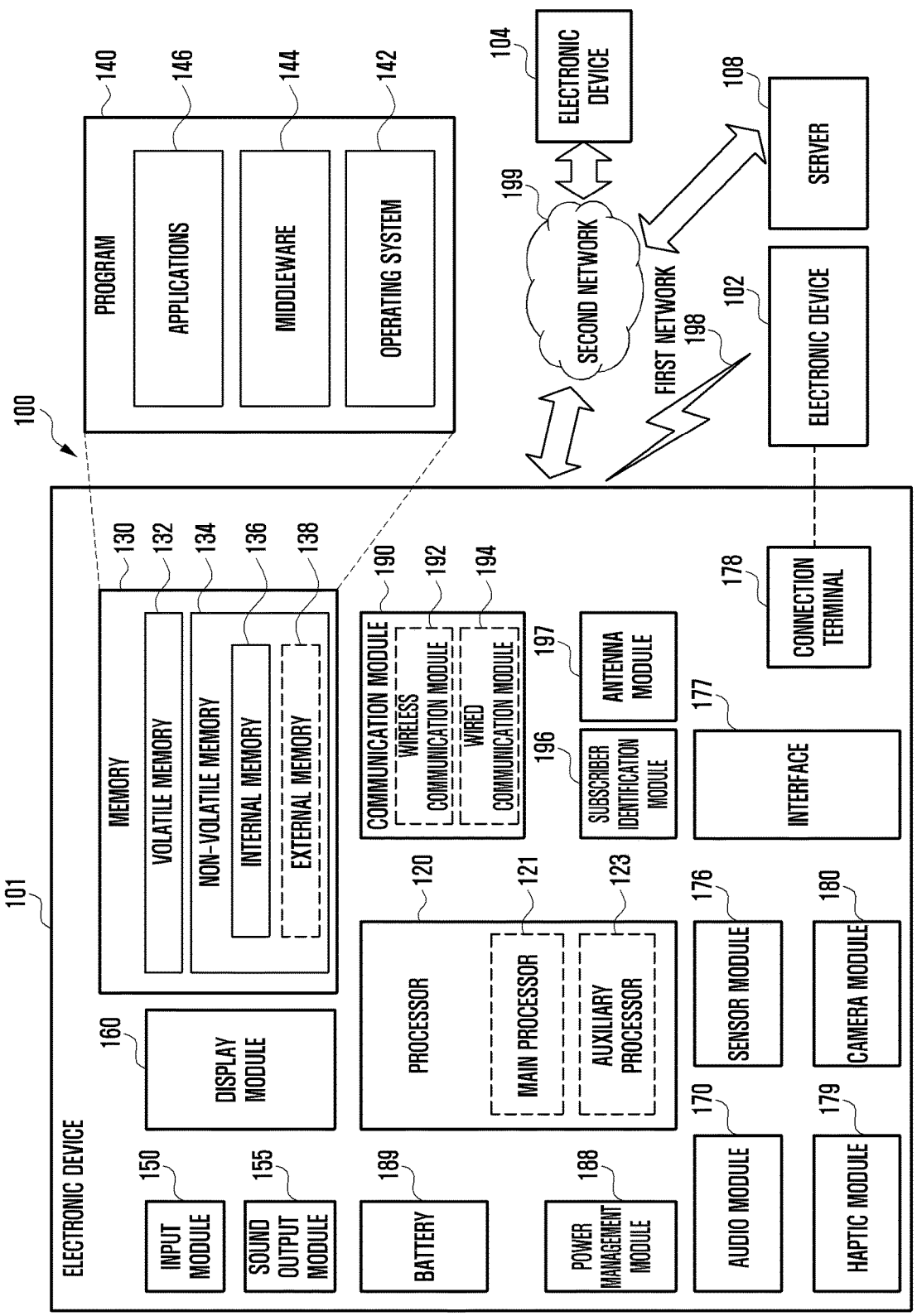
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related therertο. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Figure 2:
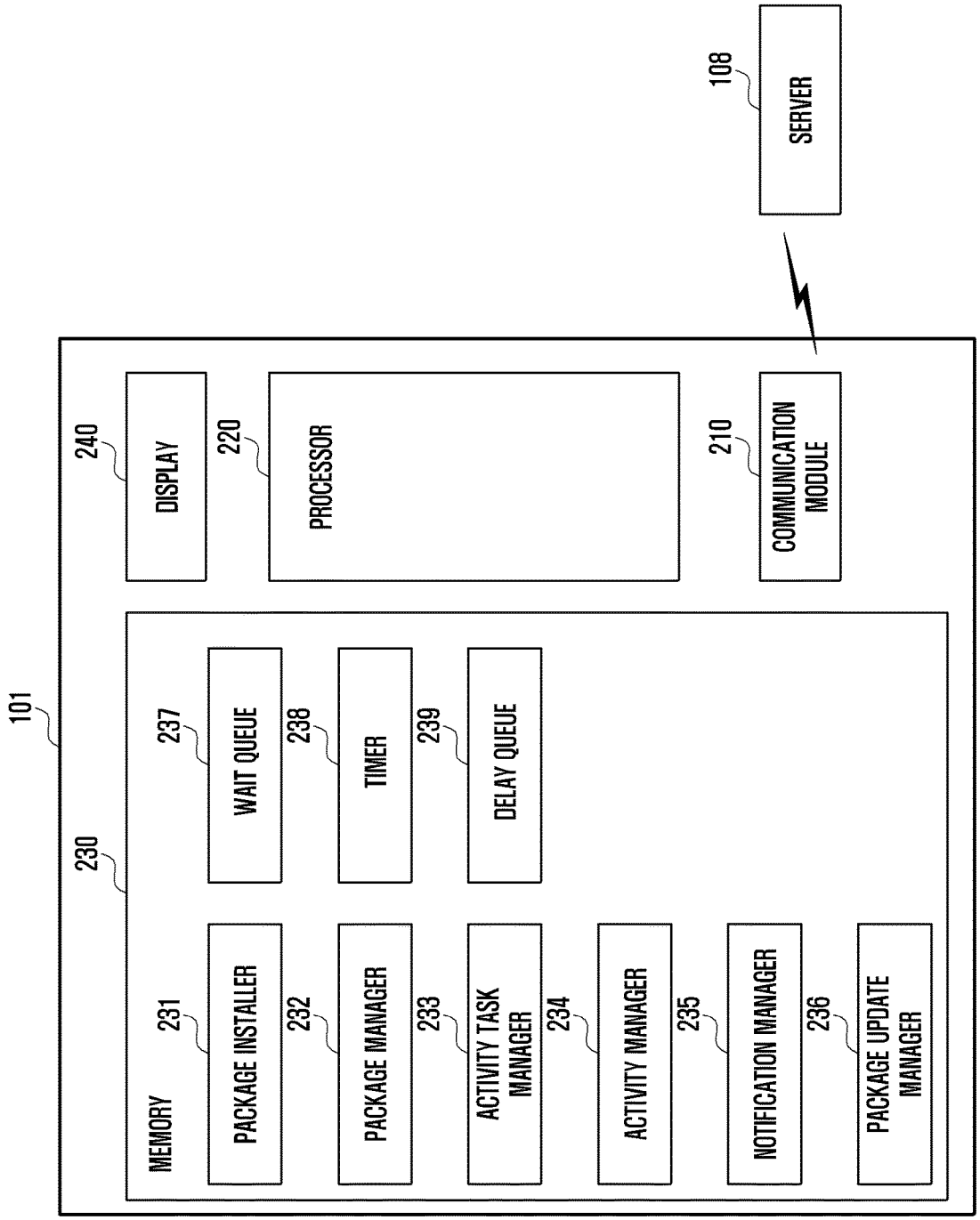
FIG. 2 is a block diagram of an electronic device that updates an application and a server according to various embodiments.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added. FIG. 2 is a block diagram of an electronic device (e.g., the electronic device 101 of FIG. 1) that updates an application and a server (e.g., the server 108 of FIG. 1) according to various embodiments.

Referring to FIG. 2, the electronic device 101 may include a communication module 210 (e.g., the communication module 190 of FIG. 1), a processor 220 (e.g., the processor 120 of FIG. 1), a memory 230. (e.g., the memory 130 of FIG. 1), and/or a display 240 (e.g., the display module 160 of FIG. 1). Components shown in FIG. 2 are only for illustration, and some of the components may be omitted or replaced or may be integrated as a single module according to various embodiments. A detailed description of components overlapping those described with reference to FIG. 1 among the components shown in FIG. 2 may be omitted herein.

According to various embodiments, the communication module 210 may support establishing a direct (e.g., wired) communication channel or a wireless communication channel between the electronic device 101 and the server 108 and performing communication through the established communication channel.

According to an embodiment, the communication module 210 may include a wireless communication module (e.g., the wireless communication module 192 of FIG. 1), and may communicate with the external server 108 through a network (e.g., the second network 199 (e.g., a long-distance communication network, such as a legacy cellular network, a 5G network, a next-generation communication network, the Internet, or a computer network (e.g., a LAN or WAN))) to transmit and receive various types of signals and/or data for updating an application.

According to various embodiments, the memory 230 may include functional modules configured to execute (or process) a function related to an update of an application of the electronic device 101.

In various embodiments, the functional modules may be included as hardware modules or software modules in at least one processor 220 including processing circuitry. The functional modules according to an embodiment shown in FIG. 2 are illustrated, for example, as being stored in the form of instructions in the memory 230 as the form of software (e.g., the program 140 of FIG. 1), and these instructions may be loaded by the at least one processor 220 to execute operations of the functional modules.

Various embodiments are not limited to the foregoing example, and the functional modules related to an update of an application may be driven as part of the processor 220 and/or may be a separate hardware configuration operated independently of the processor 220.

Referring to FIG. 2, the functional modules included in the memory 230 may include at least one of a package installer 231, a package manager 232, an activity manager 234, an activity task manager 233, a notification manager 235, a package update manager 236, a wait queue 237, a timer 238, or a delay queue. Some of the foregoing functional modules may be omitted or replaced, or may be integrated with at least one other module.

According to an embodiment, the package installer 231 may control an overall update of an application installed in the electronic device 101. According to an embodiment, the package installer 231 may detect occurrence of an update of at least one application (e.g., including installation of the application), at least based on an application store (hereinafter "app store", e.g., Google Play™ store) or a different method (e.g., installation by an Android debug bridge (ADB) instruction). According to an embodiment, the package installer 231 may make a request to receive (or download) an application installation file or an update package (e.g., *.apk, Android package kit file) from the server 108 through the communication module 210, based on detection of the application update.

According to an embodiment, the application (e.g., an Android application) may be developed in a specific programming language (e.g., Java), and the application installation file or the update package is a file required to install or update the application, may include a code (classes. dex), a resource (library and resource) (e.g. a Java source code, a layout xml file, an image file, an audio file, an animation, a menu, a style, and/or a color), and/or a signature key for authentication, and may be compressed in a zip archive format and generated as an update package file (e.g., a file with an extension "apk"). For example, one apk file refers to one application (or app), and may be a file installed in the electronic device 101.

According to an embodiment, the package manager 232 may perform an application installation operation according to an installation request from the package installer 231. According to an embodiment, the package manager 232 may perform validity check and verification of the update package (e.g., an update file related to the application to be updated) received based on the package installer 231.

According to an embodiment, when verification of the application is completed, the package manager 232 may parse an executable file (e.g., dex information) from the update package (e.g., a downloaded update package) related to the application to be updated and may generate a new profile to be used for compilation. According to an embodiment, the package manager 232 may generate files, such as a *.oat file (or native file) and a *.art file (or initialization image), by performing compilation, based on the new profile, and may generate a data directory of the application, based on the files. According to an embodiment, when installation of the application is completed, the package manager 232 may delete a previous application installation file (e.g., an .apk file).

According to an embodiment, the activity task manager 233 may store information about an activity currently being executed. For example, the activity task manager 233 may store the information about the activity as a specific object (e.g., a mLastResumedActivity object) or an instance in an activity record (ActivityRecord). For example, an object variable (e.g., a packageName value) may be stored in the specific object (e.g., mLastResumedActivity), and names of applications currently being executed in the foreground of a terminal may be stored in the object variable. A location and/or format (e.g., a record name, a specific object name, and a specific variable name) in which the activity task manager 233 stores the information about the activity currently being executed according to an embodiment may be variously modified by those skilled in the art without being limited to the above example.

According to an embodiment, the activity task manager 233 may obtain and provide stored application information according to a request for information about an application currently being executed, received from the package manager 232. For example, the activity task manager 233 may configure an application programming interface (API) for importing a specific object or instance to provide the information about the application currently being executed, and the package manager 232 may determine that an application to be currently updated is currently being executed through the API.

According to an embodiment, the activity manager 234 may store information about a target application and information about at least one application related to execution of the target application. For example, the application related to the execution of the target application may include an application accessed or referenced when the target application is executed. For example, the application related to the execution of the target application may include a dependent-relationship application or a dependent application, and the dependent-relationship or dependent application may include an application which is accessed or of which a code is referenced when a process of the target application is executed. For example, the activity manager 234 may store information about the process and the information about the dependent-relationship application in an object unit (e.g., a process record (ProcessRecord) object). For example, the activity manager 234 may store a list of package information of a dependent application (hereinafter, a dependent package information list) in an object, such as a process record of the target application. For example, the dependent package information list may be stored as an object variable (e.g., packageDependencies (pkgDeps)) used in a process record class in the process record. For example, the dependent package information list may be configured and stored in the form of an ArraySet<String> type.

According to an embodiment, when accessing a package of a different application or referencing a code of the different application with at least one process generated by executing a specific application, the different application may be referred to as a dependent-relationship application or a dependent application. For example, when accessing a provider of the package of the different application or referencing the code with the at least one process (e.g., activityThread) generated by executing the specific application, package information about the different application may be stored as a dependence information list (e.g. pkgDeps). For example, when an application to be updated is executed to access or reference a different application, the activity manager 233 may obtain information about the accessed or referenced different application, may generate package information about the different application, and may store the generated information as dependence information in the process record. For example, when the specific application uses a WebView, for example, when the specific application (e.g., KakaoTalk) uses the WebView and thus a WebViewFactory object is generated, the activity manager 233 may store information about the WebView as a dependent application of the specific application in the process record.

According to an embodiment, based on a request for information about a dependent application from the package manager 232, the activity manager 234 may identify and provide information about an application having dependence on the application, which is to be updated, from the stored dependence information list. For example, the activity manager 234 may check the process record object (e.g., pkgDeps) and may output and provide the information about the application having dependence on the application to be updated.

According to an embodiment, the package manager 232 may identify at least one application having dependence on the application to be updated through the activity manager 234, and may identify whether at least one of the application to be updated or the at least one application having dependence is currently being executed.

According to an embodiment, when the application to be updated is currently being executed and/or the application having dependence is currently being executed, the package manager 232 may insert an update package of the application into the wait queue 237 and may start the timer 238. For example, the update packages stored in the wait queue 237 may be sequentially stored in a data structure including a package path, a package name, and a package version. For example, the update package sequentially stored in the wait queue 237 may be sequentially output in an order in which the update package is stored in the wait queue 237.

According to an embodiment, when the timer 238 is completed, the package manager 232 may output data from the wait queue 237 and may identify again whether the application of the update package and/or the application having dependence is currently being executed.

According to an embodiment, as a result of identification that is performed based on completion of the timer 238, when it is identified that at least one of the application of the update package or the application having dependence is currently being executed, the package manager 232 may insert the update package into the wait queue 237 again and may configure the timer 238 again. An operation of inserting the update package into the wait queue 237 and configuring the timer 238 when the application to be updated or the application having dependence is currently being executed may be configured to be repeated, for example, up to two times, but may be preconfigured to one time or three or more times, without being limited thereto.

According to an embodiment, when the notification manager 236 may provide a user interface, which may indicate that the currently executed application (e.g., the application to be updated or the application having dependence that is being executed) may be terminated when performing an operation of updating the application to be updated, and receive a user selection to select whether to immediately install the application to be updated or to delay installation of the application. For example, in a situation in which the timer 238 is completed a preconfigured number of times and thus the update package is output from the wait queue 237, when the application to be updated and/or the application having dependence is still being executed, the notification manager 236 may notify to a user that the currently executed application may be terminated upon the application being updated and may allow the user to select whether to perform an update.

According to an embodiment, when the application to be updated and/or an associated application is currently being executed even if the timer 238 has expired, the package manager 232 may delay performing the update until a specified condition is satisfied, for example, until the user does not use the electronic device 101.

According to an embodiment, when the update is delayed, the package manager 232 may store the update package in the delay queue 239.

According to an embodiment, when the user selects to delay application update installation, the notification manager 235 may request the package manager 232 to delay the installation, and the package manager 232 may insert the update package into the delay queue 239.

According to an embodiment, when the application update installation is delayed, the package update manager 236 may identify state information about the electronic device 101 in order to identify whether a condition for performing an update is satisfied according to a configuration of the package manager 232, for example, whether the electronic device 101 is not used (e.g., a display is turned off or charging of the electronic device 101 is performed), and based on the condition being satisfied, may request the package manager 232 to output the application update package stored in the delay queue 239, based on the state information. According to an embodiment, the package manager 232 may output the update package from the delay queue 239 according to a request of the package update manager 236, may install the update package for the application, and may then update the delay queue 239.

An electronic device according to an embodiment may include: a memory (e.g., the memory 130 of FIG. 1 or the memory 230 of FIG. 2); a communication circuit (e.g., the communication module 190 of FIG. 1 or the communication module 210 of FIG. 2); and a processor (e.g., the processor 120 of FIG. 1 or the processor 220 of FIG. 2) configured to be operatively connected to the memory and the communication circuit, wherein the processor may be configured to: receive an update package of a specific application from a server through the communication circuit upon receiving a request to update the application; identify at least one application related to execution of the application; identify whether at least one of the application or the related at least one application is currently being executed; and store the update package in the memory, configure a timer for the update package, and delay updating the application, based on the timer, when at least one of the application or the related at least one application is currently being executed.

According to an embodiment, the processor may be configured to identify whether at least one of the application or the related at least one application is currently being executed as the timer expires, store the update package in the memory when at least one of the application or the related at least one application is currently being executed, and delay updating the application, based on a specified condition for an operating state of the electronic device.

According to an embodiment, the specified condition for the operating state of the electronic device may include, for example, at least one of turn-off of a display, charging in progress, or a rebooting state, and the processor may be configured to update the application, based on the update package, when at least one of the specified condition for the operating state of the electronic device is satisfied.

According to an embodiment, the processor may be configured to identify whether at least one of the application or the related at least one application is currently being executed as the timer expires, and allow a user to select whether to delay installing the update package through a user interface (e.g., by providing an operable control such as a button (e.g., a virtual button or a soft button)) when at least one of the application or the related at least one application is currently being executed.

According to an embodiment, the processor may be configured to display, through the user interface, a notification indicating that an operation of the application or the related at least one application is terminated when installing the update package.

According to an embodiment, the processor may be configured to display, through the user interface, a notification indicating that updating the application is being delayed when a delay in installing the update package is selected.

According to an embodiment, the processor may be configured to identify whether the application or the related at least one application is currently being executed as the timer expires, store the update package in the memory when the application or the related at least one application is currently being executed, reconfigure the timer for the update package, and delay updating the application, based on the reconfigured timer.

According to an embodiment, the processor may be configured to identify whether the application or the related at least one application is currently being executed as the timer expires, and update the application, based on the update package, when the application and the related at least one application are not currently being executed.

According to an embodiment, the memory may store an activity record including a list of an application currently being executed, and the processor may be configured to output the list of the application currently being executed from the activity record, and identify whether the application or the related at least one application is currently being executed based on the list from the memory.

According to an embodiment, the memory may store process record objects that store information about a different application accessed or referenced by the application, and the processor may be configured to output the information about the different application accessed or referenced by the application as information about the related at least one application from the process record objects. Various embodiments to be described below illustrate an example of the operation of the foregoing electronic device and may be variously modified by a person skilled in the art, without being limited thereto.

Figure 3:
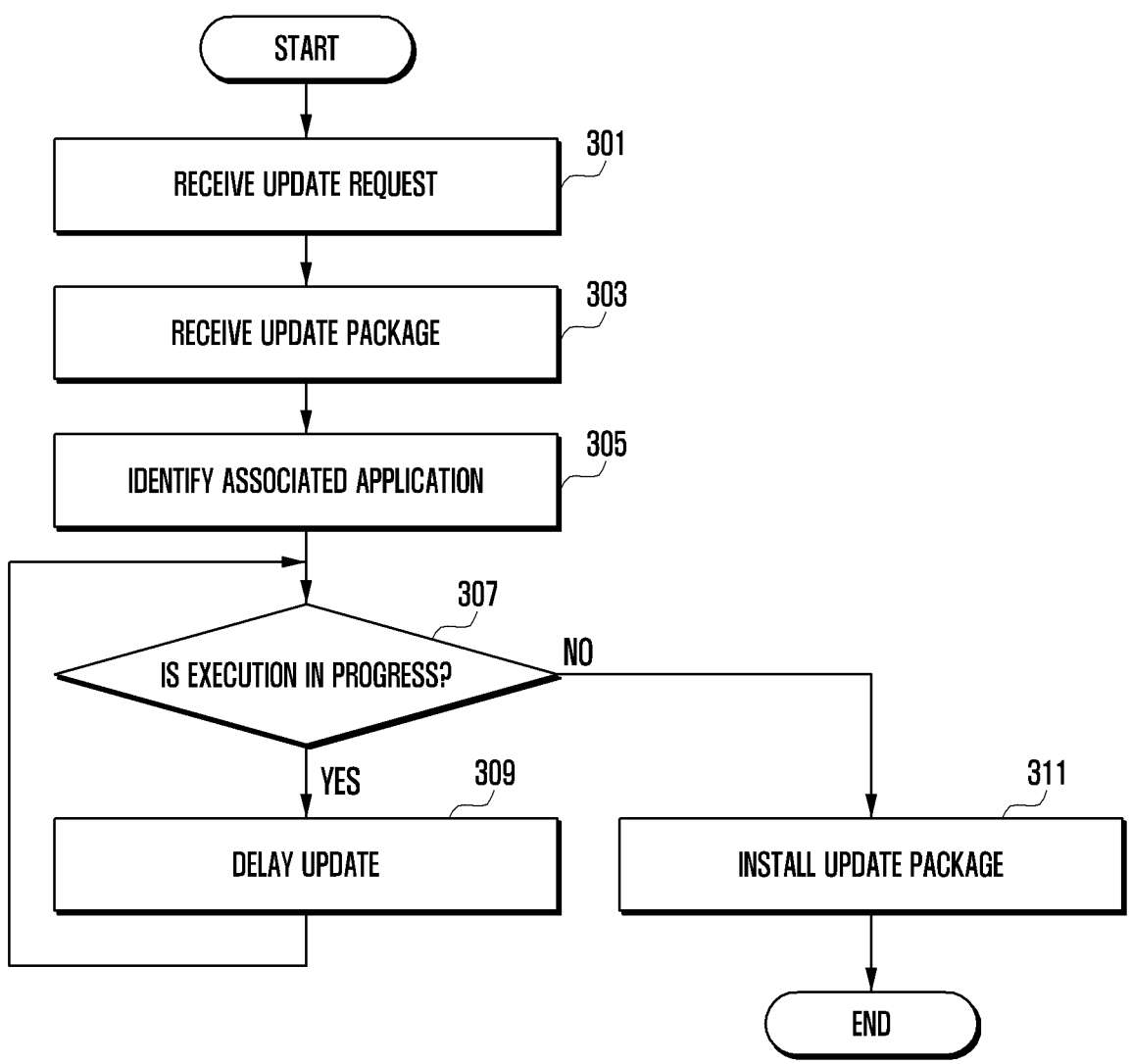
FIG. 3 is a flowchart illustrating an operation of an electronic device performing an application update according to an embodiment.

FIG. 3 is a flowchart illustrating the operation of an electronic device (e.g., the electronic device 101 of FIG. 2) performing an application update according to an embodiment.

According to various embodiments, an application update method of FIG. 3 may be performed by at least one processor (e.g., the processor 220 of FIG. 2). According to an embodiment, the application update method of FIG. 3 may be performed by functional modules driven as part of the processor and/or configured as separate hardware operated independently of the processor. According to an embodiment, the application update method of FIG. 3 may be performed by software instructions (e.g., at least one of the package installer 231, the package manager 232, the activity manager 233, the activity task manager 234, the notification manager 235, and the package update manager 236 included in the memory 230) loaded from a memory (e.g., the second memory 230 of FIG. 2) and executed by the processor.

According to various embodiments, in operation 301, the processor may receive a request to update a specific application from a server (e.g., the server 108 of FIG. 2) or from an input module (e.g., the input module 150 of FIG. 1). For example, when an automatic update is configured for the specific application, the processor may receive the request to update the application at a specific time according to an automatic update function provided by an app store provided by the server. For example, when the automatic update is not configured, the processor may receive and display a notification that it is possible to update the application through an app store application from the server, and may receive the request to update the application according to an input from a user accordingly.

According to various embodiments, when the request to update the specific application is received, the processor may receive an update package for updating the application to be updated from the server in operation 303. For example, the update package may be an update package file (e.g., a file with an extension "apk") required to update the application. For example, the update package may include a code (classes. dex), a resource (library and resource) (e.g. a Java source code, a layout xml file, an image file, an audio file, am animation, a menu, a style, and/or a color), and/or a signature key for authentication for updating the application.

According to various embodiments, in operation 305, the processor may identify at least one application associated with the application to be updated. For example, the associated application may be an application having dependence on the application to be updated. For example, the associated application may be an application that is accessed or referenced when the application to be updated is executed.

According to an embodiment, the processor may obtain information about the associated application from a process record. For example, an activity manager (e.g., the activity manager 234 of FIG. 2) may obtain information about a process and information about an application having a dependence relationship from a process record (ProcessRecord) object. For example, a dependent package information list may be stored as an object variable (e.g., packageDependencies (pkgDeps)) used in a process record class in the process record, and the information about the application having dependence may be obtained with reference to the dependent package information list.

According to various embodiments, in operation 307, the processor may identify whether at least one of the application to be updated or the at least one associated application is currently be executed. According to an embodiment, the processor may obtain a list of a currently executed application from an activity record and may compare the list with information about the application to be updated and/or the associated application. For example, the processor may obtain a name of an application in which information about an activity currently being executed is stored in as an object (e.g., mLastResumedActivity) or an instance in the activity record (ActivityRecord) through an activity task manager (e.g., the activity task manager 233 of FIG. 2). For example, the processor may extract names of applications currently being executed in the foreground of a terminal from the value of an object variable (e.g., packageName) stored by the object.

According to various embodiments, when the application to be updated or the at least one associated application is currently being executed, the processor may delay updating the application until a specified condition is satisfied in operation 309.

According to an embodiment, for example, the processor may store an update file of the application to be updated in the memory and may delay the update until a specified time elapses.

According to an embodiment, for example, the processor may store the update file of the application to be updated in the memory and may delay the update until the state of the electronic device satisfies a specified condition (e.g., turning off a display, charging, the user's selection of an immediate update, or rebooting).

According to an embodiment, in operation 311, when the application to be updated and the at least one associated application are not currently being executed, the processor may install the update package.

Figure 4:
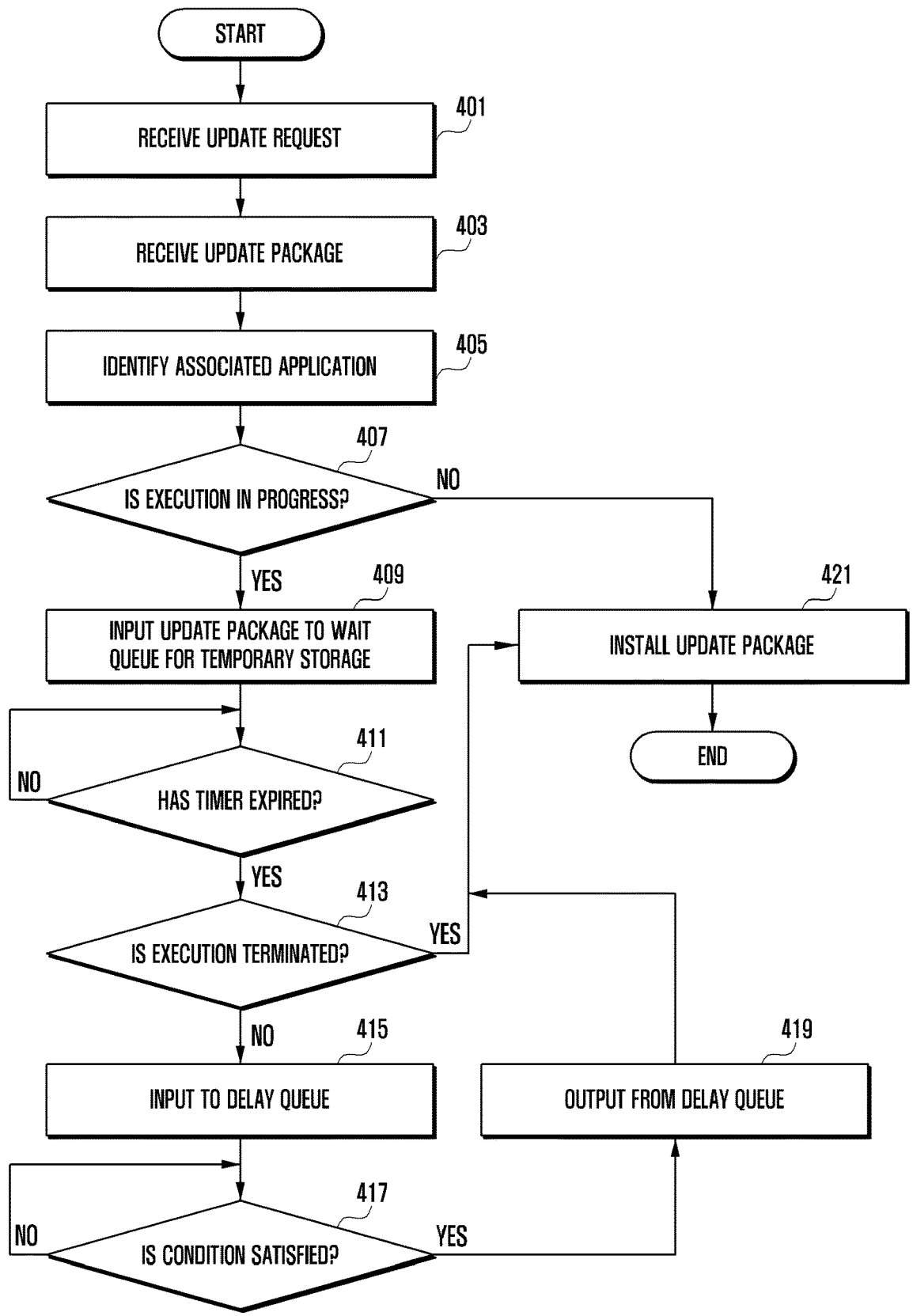
FIG. 4 is a flowchart illustrating an operation of an electronic device performing an application update according to an embodiment.

FIG. 4 is a flowchart illustrating the operation of an electronic device performing an application update according to another embodiment.

According to various embodiments, an application update method of FIG. 4 may be performed by at least one processor (e.g., the processor 220 of FIG. 2). According to an embodiment, the application update method of FIG. 4 may be performed by functional modules driven as part of the processor and/or configured as separate hardware operated independently of the processor. According to an embodiment, the application update method of FIG. 4 may be performed by software instructions (e.g., at least one of the package installer 231, the package manager 232, the activity manager 233, the activity task manager 234, the notification manager 235, and the package update manager 236 included in the memory 230) loaded from a memory (e.g., the second memory 230 of FIG. 2) and executed by the processor. Operation 401 to operation 407 of FIG. 4 are similar to operation 301 to operation 307 of FIG. 3, and a detailed description thereof may be omitted herein.

According to various embodiments, in operation 401, the processor may receive a request to update a specific application. For example, regarding the specific application, the processor may receive the request to update the application from a server at a specific time, for example, through an app store application, or may receive the request to update the application according to an input from a user.

According to various embodiments, when the request to update the specific application is received, the processor may receive an update package for updating the specific application from the server in operation 403. For example, the update package may be an update package file (e.g., a file with an extension "apk") that is needed to update the specific application.

According to various embodiments, in operation 405, the processor may identify at least one application associated with the application to be updated. For example, the associated application may be an application having dependence on the application to be updated, and may be an application that is accessed or referenced when the application to be updated is executed. According to an embodiment, the processor may obtain information about the associated application from a process record.

According to various embodiments, in operation 407, the processor may identify whether at least one of the application to be updated or the at least one associated application is currently be executed. According to an embodiment, the processor may obtain a list of a currently executed application from an activity record and may compare the list with information about the application to be updated and/or the associated application, thereby identifying whether the application to be updated or the associated application is currently be executed.

According to various embodiments, when the application to be updated or the at least one associated application is currently being executed, the processor may store the update package of the application in a wait queue (e.g., the wait queue 237 of FIG. 2) for temporary storage and may configure a timer in operation 409. According to an embodiment, the processor may delay the update package stored in the wait queue until the timer expires.

According to an embodiment, the processor may identify whether the timer has expired in operation 411, may output the update package from the wait queue when the timer expires, and may identify whether execution of the application to be updated and/or the at least one associated application is terminated in operation 413.

According to an embodiment, when the execution of the application to be updated and/or the at least one associated application is not terminated, the processor store the update package of the application to be updated in a delay queue (e.g., the delay queue 239 of FIG. 2) in operation 415.

According to another embodiment, regarding the update package of the application output from the wait queue, when the application or the at least one associated application is still being executed, the processor may store the downloaded update package again in the wait queue. For example, an operation of storing the update package of the application to be updated in the wait queue and delaying the same by configuring a timer when the application to be updated or the at least one associated application is currently being executed may be configured to be performed a plurality of times (e.g., twice or more).

According to an embodiment, in operation 417, the processor may identify whether a specified condition for outputting the update package from the delay queue and performing an update is satisfied. For example, the specified condition may include a condition for the state of the electronic device 101, for example, a condition that a display is turned off, that charging is in progress, or that rebooting is performed after turn-off.

According to an embodiment, when the specified condition is satisfied, the processor may output the update package from the delay queue in operation 419 and may install the update package in operation 421. Operations 417 and 419 may be performed even before the timer configured in operation 415 expires.

According to an embodiment, when determining that the application to be updated and the at least one associated application are not currently being executed in operation 407, when determining that the execution of the application to be updated or the at least one associated application is terminated after the wait queue timer expires in operation 413, or when determining that the update package is output from the delay queue as the condition is satisfied in operation 419, the processor may install the update package in operation 421. According to an embodiment, the processor may perform validity check and verification of the update package, may generate a new profile to be used for compilation by parsing an executable file (e.g., dex information) from the update package when completing the verification, may perform compilation, based on the new profile, and may generate a data directory of the application. According to an embodiment, when the application is completely installed, the processor may delete a previous application installation file (e.g., an .apk file).

Figure 5:
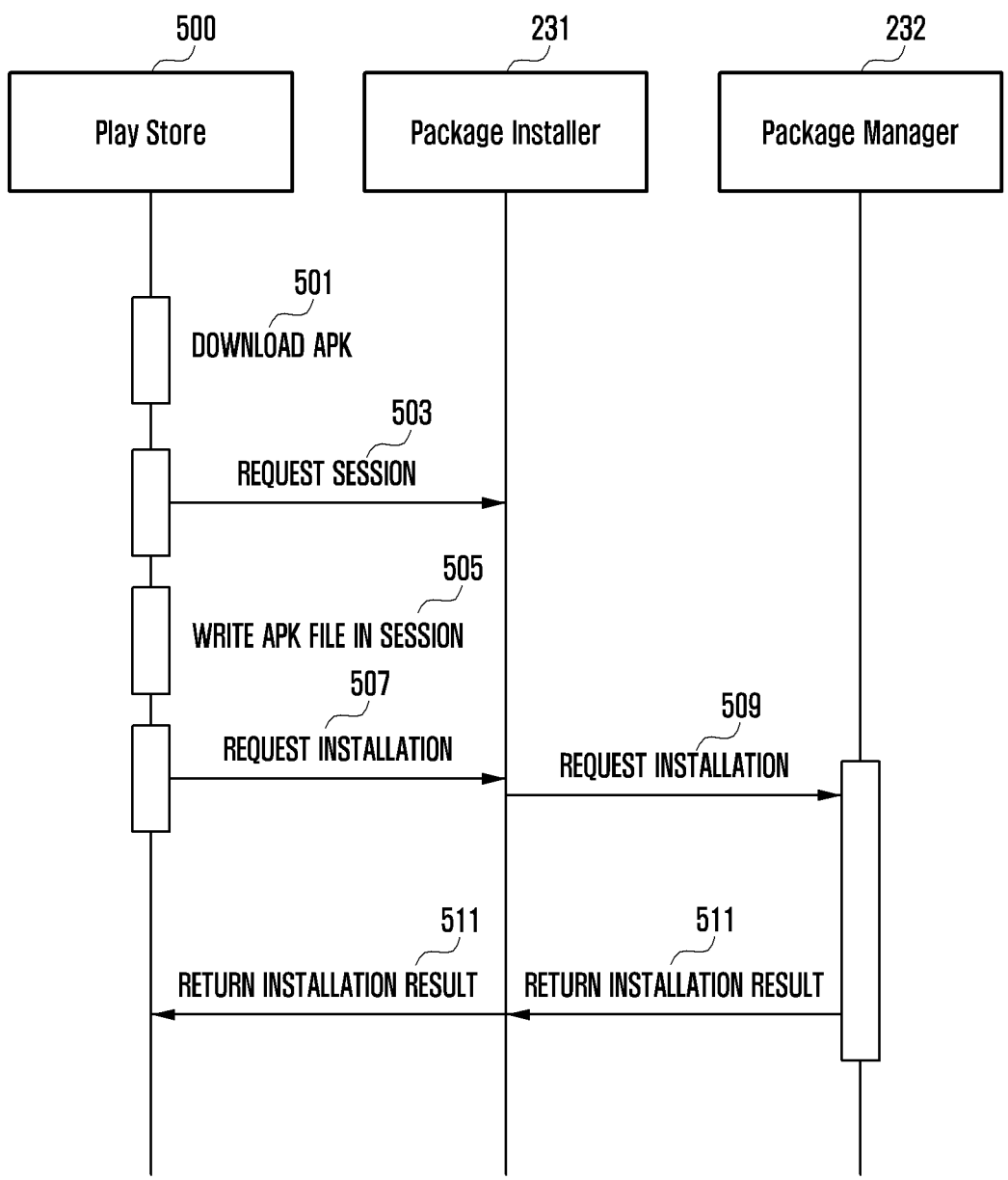
FIG. 5 is a flowchart illustrating signal processing between functional modules of an electronic device performing an application update and a server according to various embodiments.

FIG. 5 is a flowchart illustrating signal processing between functional modules of an electronic device (e.g., the electronic device 101 of FIG. 2) performing an application update according to various embodiments.

According to various embodiments, operations of FIG. 5 may be performed by a package installer (e.g., the package installer 231 of FIG. 2) and a package manager (e.g., the package manager 232 of FIG. 2), driven by a server and at least one processor (e.g., the processor 220 of FIG. 2), and an update function provided by an app store application 500 (hereinafter, referred to as an app store 500). The app store application 500 is an application (e.g., Google Play™ store) installed on the electronic device 101 and is an example of an application for downloading, installing, and updating various applications from an app store provided by the server.

According to various embodiments, in operation 501, the app store 500 may download an application update package according to an automatic update configuration of a specific application or an update request by a user.

According to various embodiments, in operation 503, the app store 500 may request and generate a session from the package installer 231 to store the downloaded update package in a location accessible by the package installer 231.

According to an embodiment, in operation 505, the app store 500 may store a downloaded update package file, based on the generated session.

According to an embodiment, the app store 500 may check integrity of the update package file and may request the package installer 231 to install the update package in operation 507, and the package installer 231 may request the package manager 232 to install the update package in operation 509.

According to an embodiment, when the update package is completely installed, the package manager 232 may return an installation result to the package installer 231 in operation 511, and the package installer 231 may transmit the installation result to the app store 500.

Figure 6:
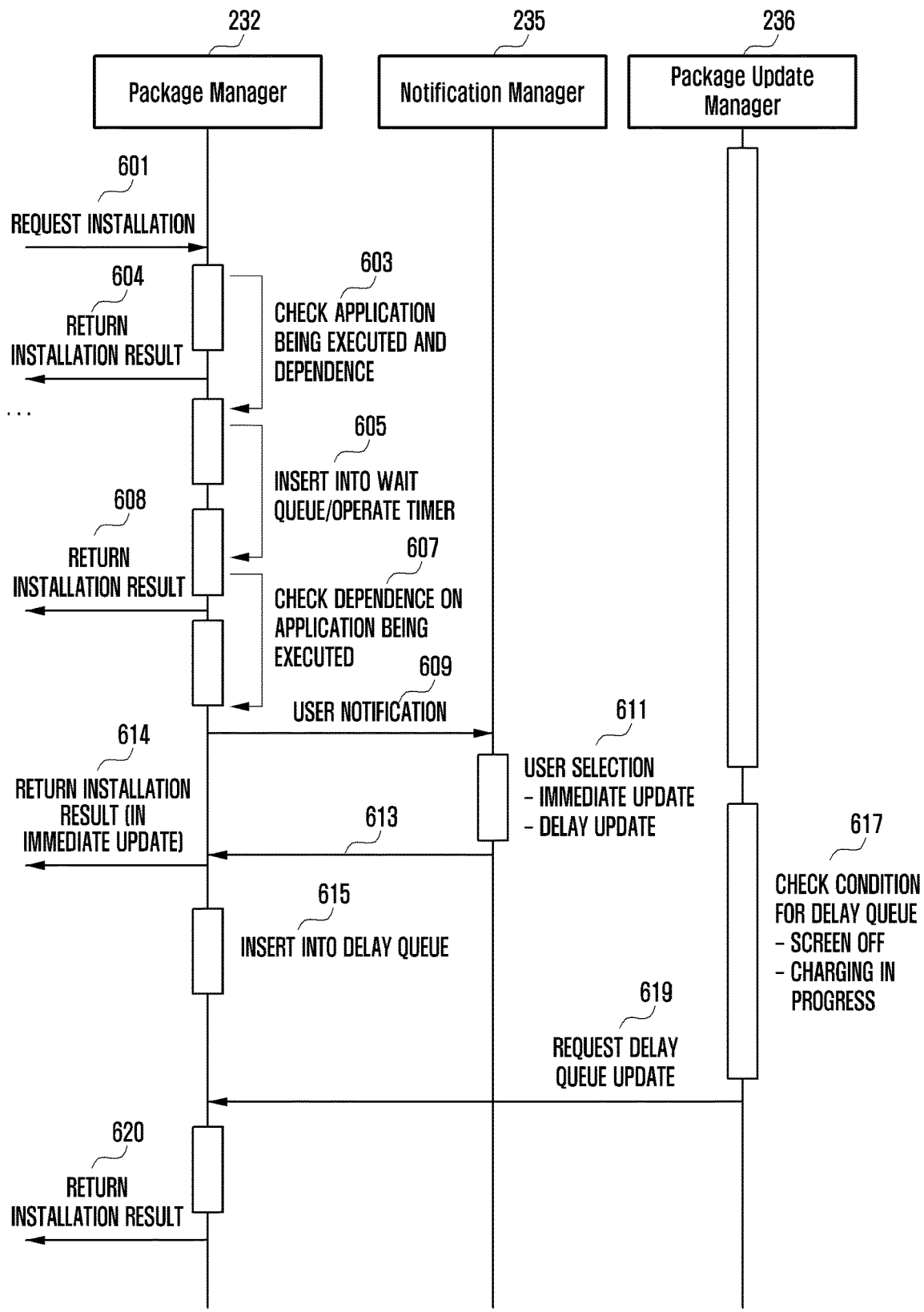
FIG. 6 is a flowchart illustrating signal processing between functional modules of an electronic device performing an application update according to various embodiments.

FIG. 6 is a flowchart illustrating signal processing between functional modules of an electronic device (e.g., the electronic device 101 of FIG. 2) performing an application update according to various embodiments.

According to various embodiments, operations of FIG. 6 may be performed by a package manager (e.g., the package manager 232 of FIG. 2), a notification manager (e.g., the notification manager 235 of FIG. 2), and a package update manager (e.g., the package update manager 236 of FIG. 2) driven by at least one processor (e.g., the processor 220 of FIG. 2).

According to various embodiments, in operation 601, the package manager 232 may receive an update installation request for a specific application, based on an update package downloaded by a package installer 231, as in operation 509 described with reference to FIG. 5, and in operation 603, may identify a list of applications currently being executed in the foreground of the electronic device 101, thereby identifying dependency including whether the application to be updated is currently being executed or refers to or accesses an application being executed.

According to various embodiments, when the applications currently being executed are neither applications to be updated nor dependent applications, the package manager 232 may install the downloaded update package and may return an installation result to the package installer 231 in operation 604.

According to various embodiments, when the application to be updated is currently being executed or a dependent application is currently being executed, the package manager 232 may store the downloaded update package in a temporary space, for example, a wait queue, and may operate a timer in operation 605.

According to various embodiments, when the timer expires, the package manager 232 may output the update package from the wait queue, and may identify the list of the applications being executed again, thereby identifying whether the application to be updated is being executed or the dependent application is being executed in operation 607.

According to various embodiments, when the applications currently being executed are neither applications to be updated nor dependent applications, the package manager 232 may install the downloaded update package and may return an installation result to the package installer 231 in operation 608.

According to an embodiment, when the application to be updated is being executed or the dependent application is being executed, the package manager 232 may request the notification manager 235 to determine whether to install the application update package through a user notification in operation 609.

According to an embodiment, the notification manager 236 may provide a user interface, which may indicate that the currently executed application may be terminated when performing an update operation of the application, receive an input (or a command) indicating whether to immediately perform an update or to delay the update in operation 611, and return a result to the package manager 232 accordingly in operation 613.

According to various embodiments, when a user selects an immediate update, the package manager 232 may install the downloaded update package and may return an installation result to the package installer 231 in operation 614.

According to various embodiments, when the user selects a delay in the update, the package manager 232 may insert the update package of the application to be updated into a delay queue (e.g., the delay queue 239 of FIG. 2) in operation 615.

According to various embodiments, in operation 617, the package update manager 236 may identify whether a condition for the delay queue is satisfied. For example, the specified condition may include a condition for the state of the electronic device 101, for example, a condition that a display is turned off, that charging is in progress, or that rebooting is performed after turn-off. For example, operation 617 may be performed with or without performing the user notification in operation 609. Also, operation 617 may be performed when the input to delay the update is received in operation 611.

According to an embodiment, when the specified condition is satisfied, the package update manager 236 may request the package manager 232 to update the delay queue in operation 619, and accordingly the package manager 232 may output the update package from the delay queue, may install the update package, and may return an installation result the package installer 231 in operation 620.

Figure 7:
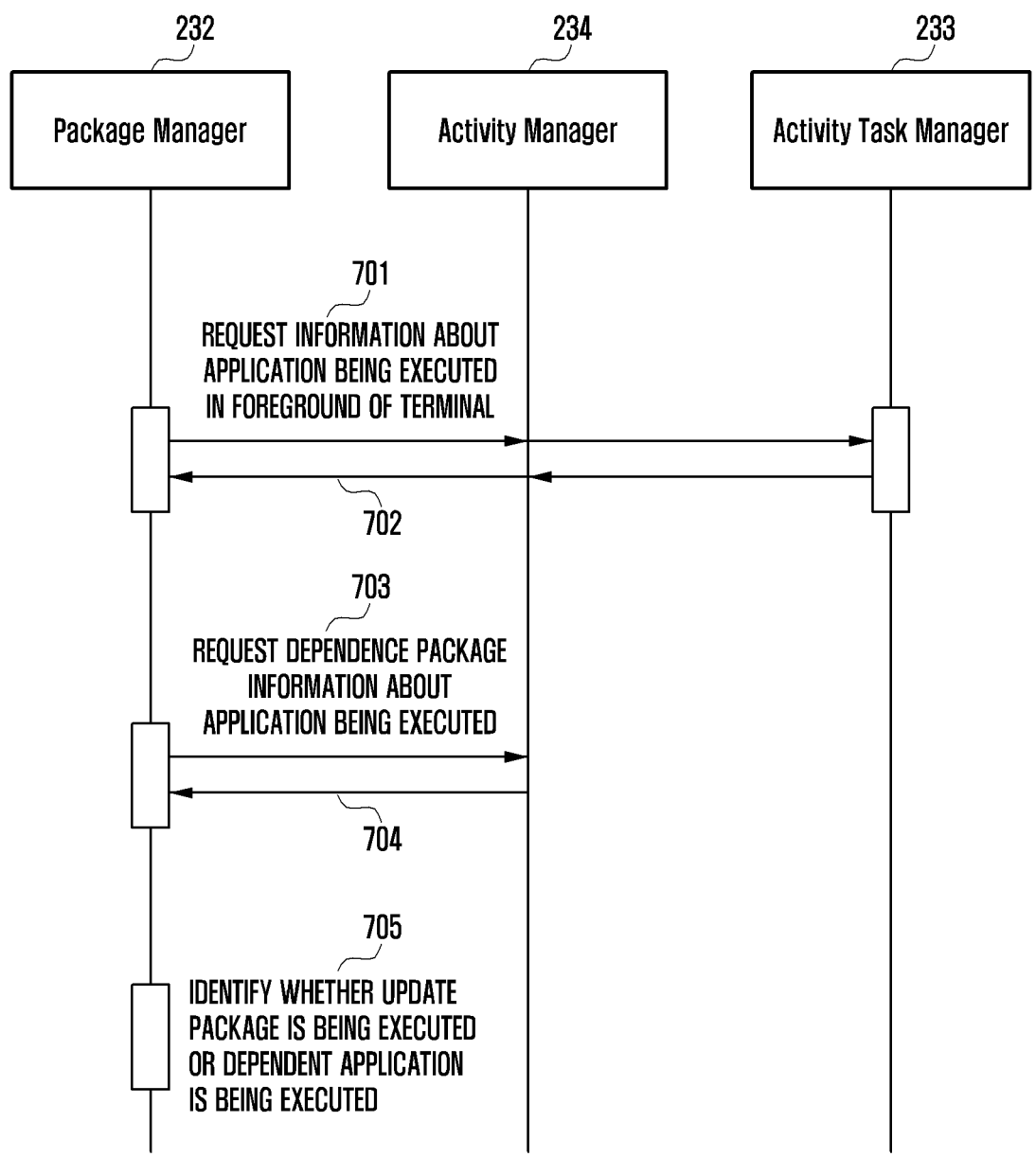
FIG. 7 is a flowchart illustrating signal processing between functional modules identifying information about an application being executed and a dependent application according to various embodiments.

FIG. 7 is a flowchart illustrating signal processing between functional modules identifying information about an application being executed and a dependent application according to various embodiments.

According to various embodiments, operations of FIG. 7 may be performed by a package manager (e.g., the package manager 232 of FIG. 2), an activity task manager (e.g., the activity task manager 233 of FIG. 2), and an activity manager (e.g., the activity manager 234 of FIG. 2) driven by at least one processor (e.g., the processor 220 of FIG. 2).

According to various embodiments, after downloading an update package for an application, the package manager 232 may request information about an application being executed in the foreground of the electronic device 101 from the activity task manager 233 in operation 701 and may receive a list of information about an application currently being executed in operation 702.

According to an embodiment, the activity task manager 233 may store information about an activity currently being executed in an activity record (ActivityRecord). According to an embodiment, the activity task manager 233 may configure an API for importing the information about the application currently being executed in the activity record and may extract the information about currently being executed according to a request for the information about the application currently being executed from the package manager 232.

According to various embodiments, the package manager 232 may request information about an application having dependence on the application to be updated of the electronic device 101 from the activity manager 234 in operation 703, and may receive the information about the application having dependence in operation 704.

According to an embodiment, the activity manager 234 may store information about a process and information about an application having a dependent relationship in units of a process record (ProcessRecord) object. For example, the activity manager 234 may extract information about a different application accessed or referenced by the application to be updated as dependent application information from a process record for the application to be updated.

According to various embodiments, the package manager 232 may determine whether the application to be updated is currently being executed or has dependence on the application being executed, based on the information received from the activity task manager 233 and the activity manager 234 in operation 705.

FIGS. 8A, 8B, 8C, 8D, 8E and 8F illustrate examples of user interfaces of an app store (e.g., the app store 500 of FIG. 5) according to implementation of an application update operation by an electronic device (e.g., the electronic device 101 of FIG. 1) according to various embodiments.

Figure 8A:
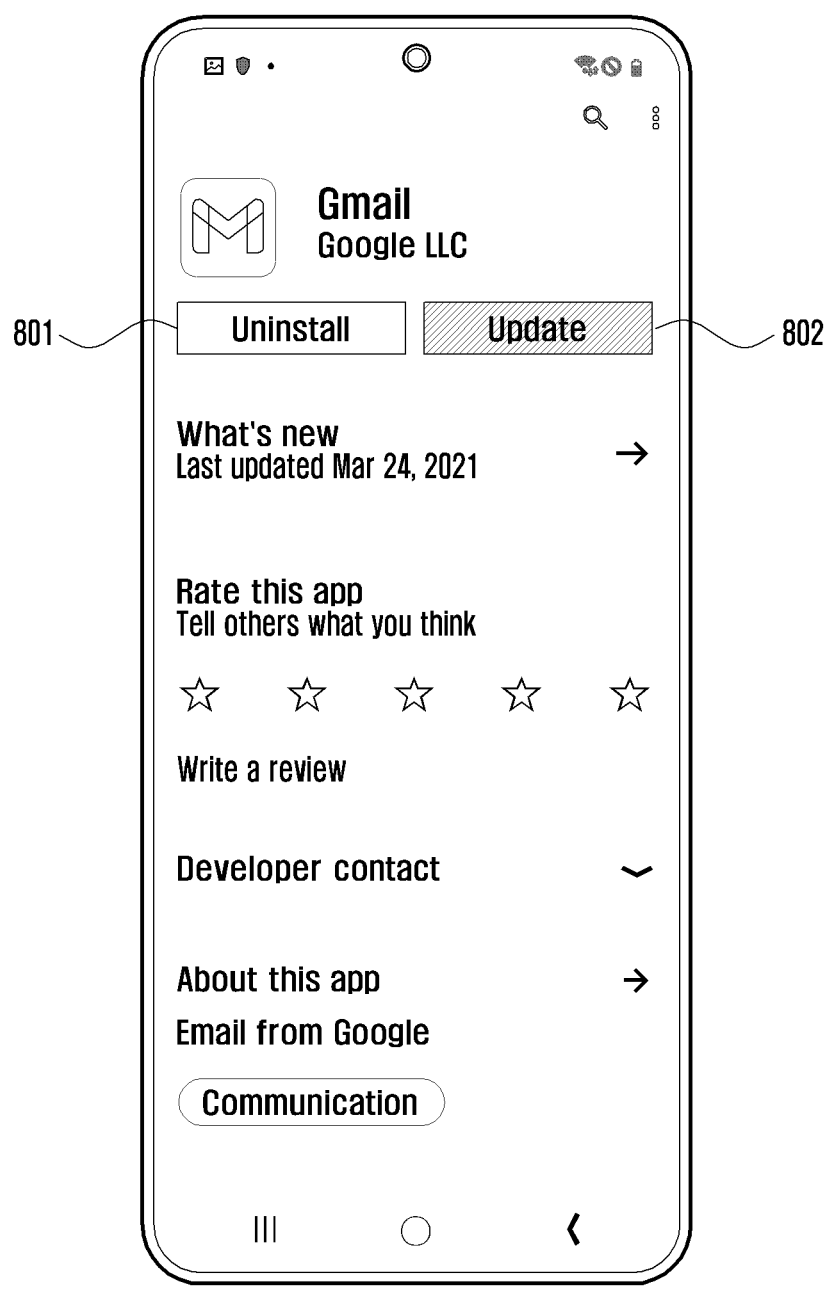
FIGS. 8A, 8B, 8C, 8D, 8E and 8F illustrate examples of app store user interfaces according to an application update operation according to various embodiments.

Referring to FIG. 8A, an interface of the app store 500 may provide a configuration screen for updating a specific application (e.g., a Gmail application). For example, a Gmail update configuration screen may provide an uninstall button 801 for uninstalling the application and an update button 802 along with various types of information about the Gmail application. For example, the uninstall button 801 may be activated when the Gmail application is installed in the electronic device 101, and the update button 802 may be activated when an update package for the Gmail application may be provided from a server (e.g., the server 108 of FIG. 2).

Figure 8B:
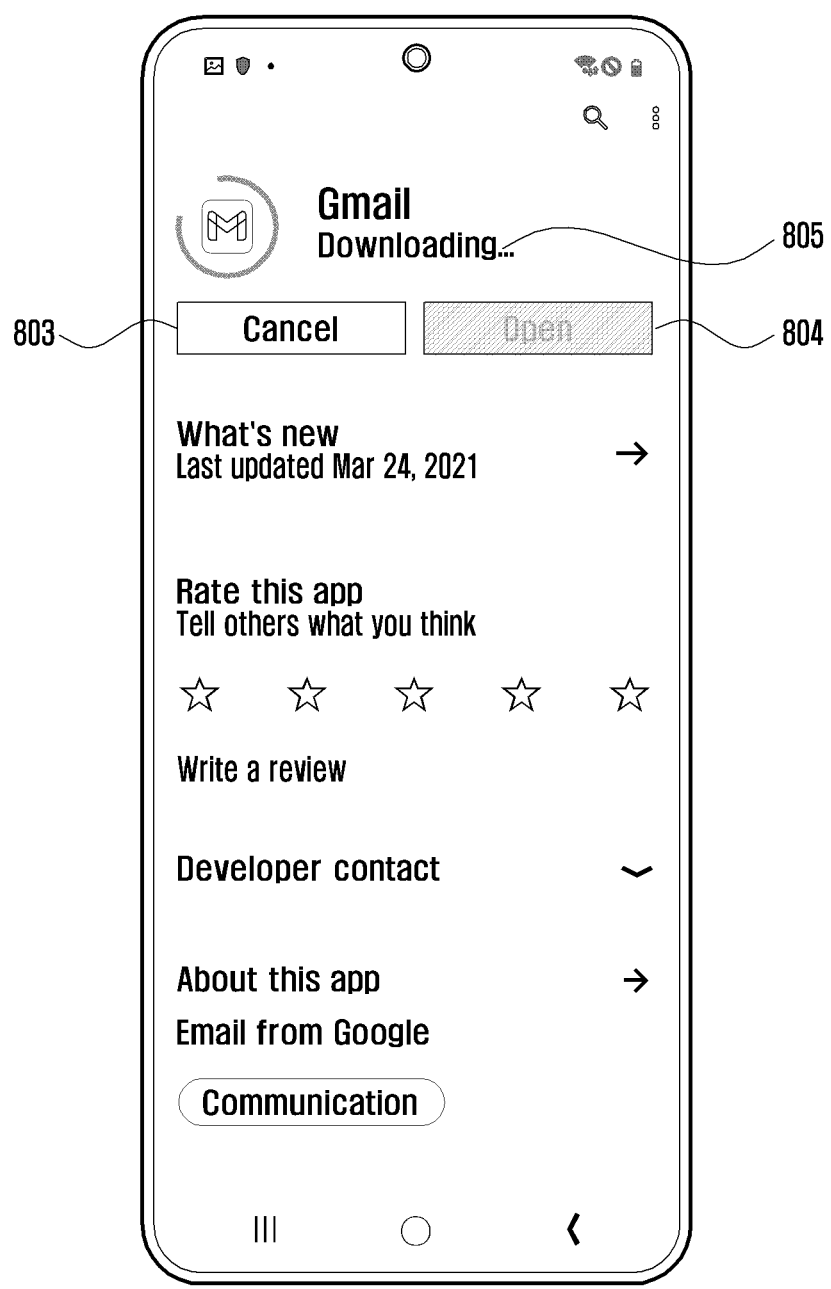

When the update button 802 is selected on the user interface of FIG. 8A, the interface of the app store 500 switches to an interface screen as shown in FIG. 8B, which provides a button (cancel) 803 for canceling download or installation and an application import button (open) 804 along with a text notification (downloading) 805 indicating that the update package is being downloaded. In the drawing, the application import button 804 may be deactivated until the update is completed.

Figure 8C:
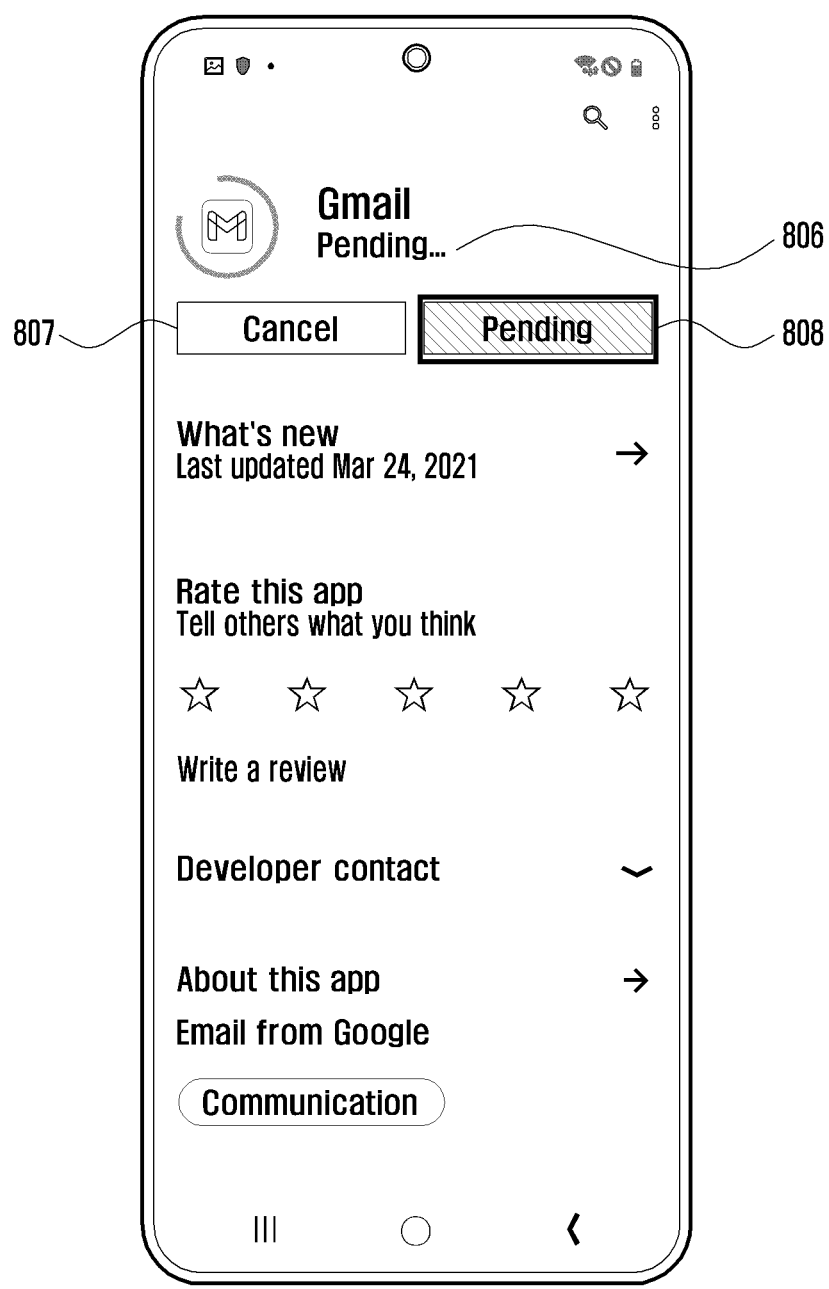

According to various embodiments, when the Gmail application to be updated is currently being executed in the foreground of the electronic device 101 or a dependent application is being executed, a text notification (pending) 806 indicating that an update is currently delayed may be displayed as shown in FIG. 8C, and a delay button (pending) 808 selectable to delay an update and an update cancel button (cancel) 807 may be provided.

Figure 8D:
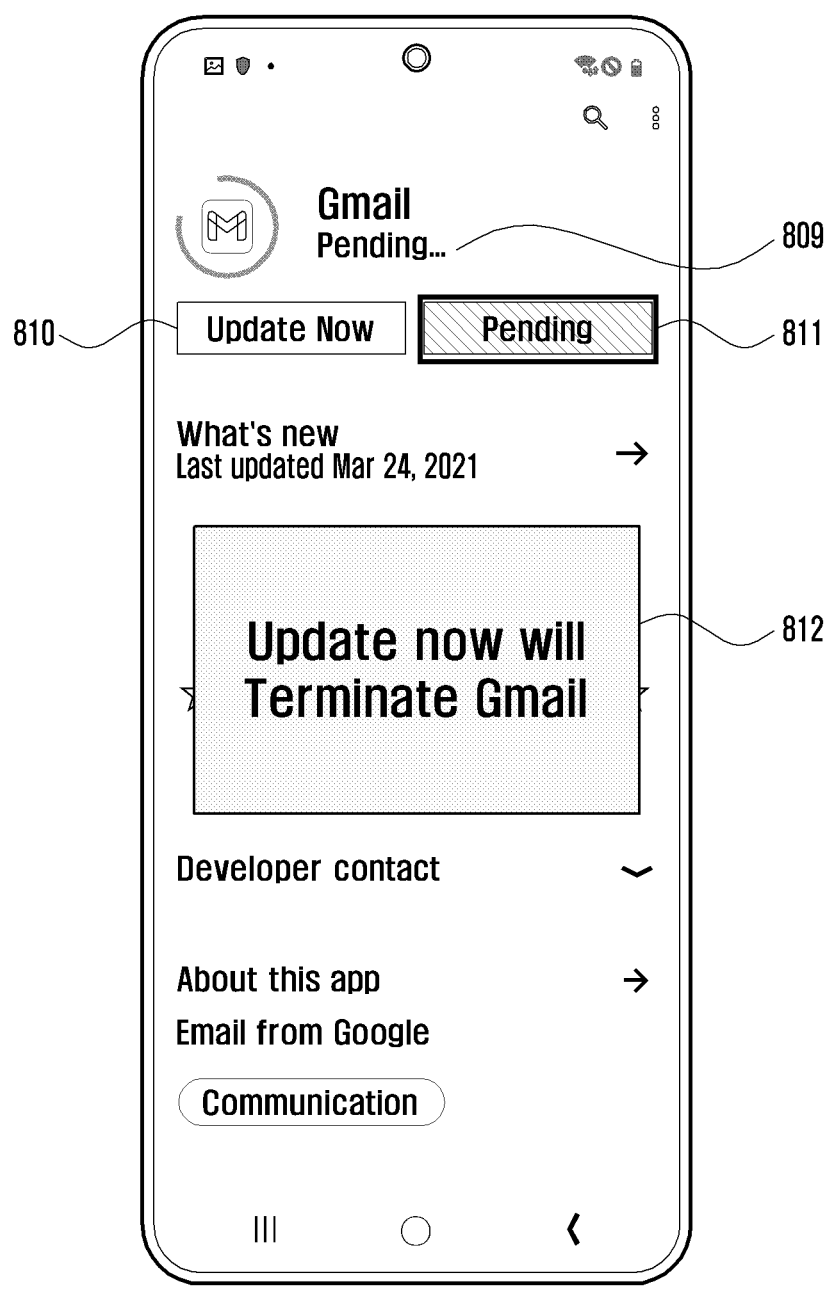

According to various embodiments, when the Gmail application to be updated is currently being executed in the foreground of the electronic device 101 or a dependent application is being executed, a text notification (pending) 809 indicating that an update is currently delayed may be displayed as shown in FIG. 8D. Further, for example, a notification 812 indicating an immediate update will terminate the application may be provided through a pop-up window, and an immediate update button (update now) 810 selectable to perform an immediate update and a delay button (pending) 811 selectable to delay an update may be provided.

Figure 8E:
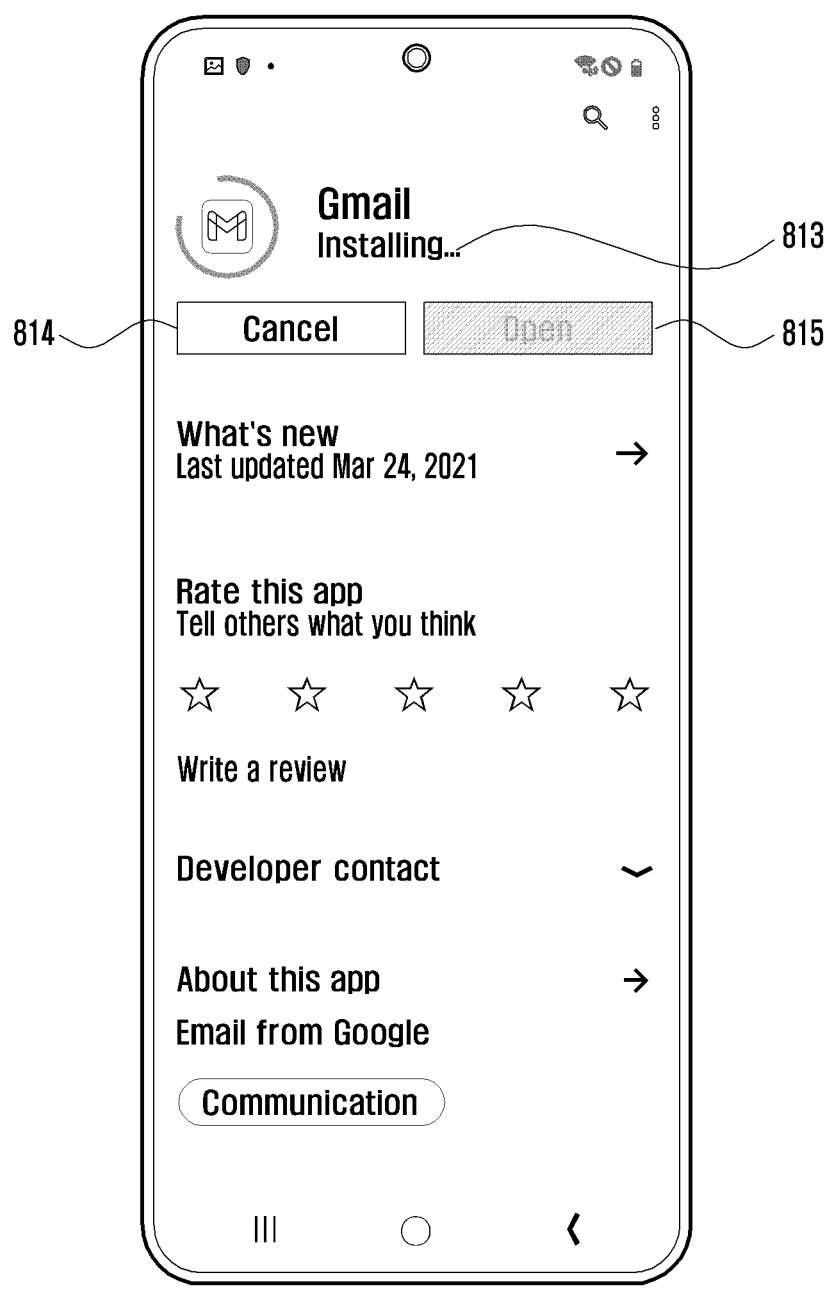

According to various embodiments, after delaying updating the update package, when the Gmail application to be updated and the dependent application executed in the foreground are terminated, or when the update package is being installed as the operating state of the electronic device 101 satisfies a specified condition, a text notification (installing) 813 indicating that the update is in progress may be displayed as shown in FIG. 8E, and an uninstall button 814 and a post-installation application import button 815 may be provided. The application import button 815 may be deactivated until the update installation is completed.

Figure 8F:
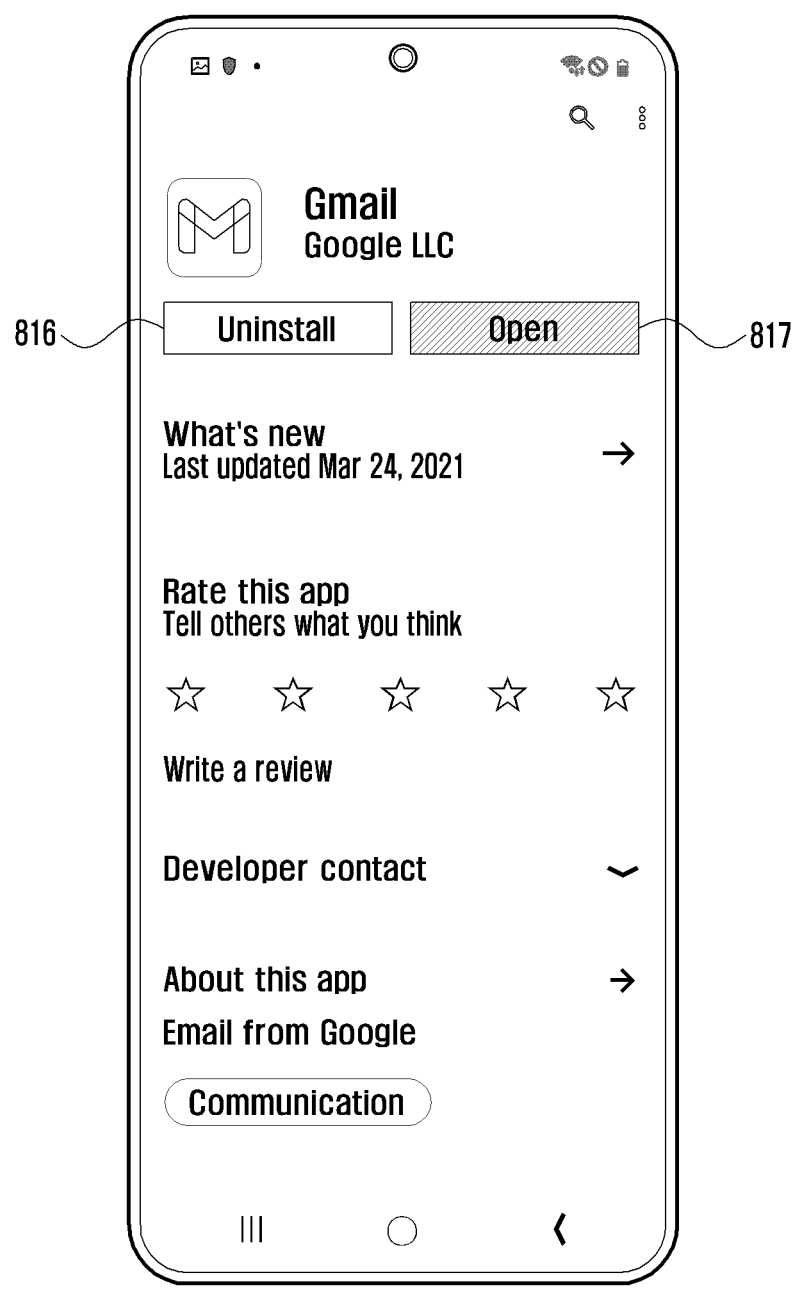

Referring to FIG. 8F, when the update package is completely installed, the user interface may provide an application uninstall button (uninstall) 816 and an application import button (open) 817. As the update installation is completed, the application import button 817 may be activated.

Embodiments disclosed herein are merely to provide some examples in order to easily describe technical content and to assist understanding and are not intended to limit the scope of technology disclosed herein. Therefore, the scope of the technology disclosed herein should be interpreted to include all changes or modifications derived based on the technical idea of various embodiments disclosed herein in addition to the embodiments disclosed herein.

What is claimed is:

1. An electronic device comprising:
   memory;
   communication circuitry; and
   at least one processor configured to be operatively connected to the memory and the communication circuitry, wherein the memory stores instructions which, when executed by the at least one processor, cause the electronic device to:
   receive an update package of a first application from a server through the communication circuitry, based on a request to update the first application;
   identify at least one related application related to execution of the first application;
   identify whether at least one of the first application or the at least one related application is currently being executed;
   identify whether the execution of the at least one of the first application or the at least one related application would be terminated by installing the update package;
   based on identifying that the execution of the at least one of the first application or the at least one related application currently being executed would be terminated by installing the update package, store the update package in the memory, and delay updating the first application by using a timer; and
   based on an expiration of the timer, automatically install the update package to update the first application.

2. The electronic device of claim 1, wherein the memory further stores instructions which, when executed by the at least one processor, cause the electronic device to:
   identify, based on the expiration of the timer, whether the at least one of the first application or the at least one related application is currently being executed; and
   delay updating the first application, based on identifying that the at least one of the first application or the at least one related application is currently being executed and a condition of the electronic device not being satisfied.

3. The electronic device of claim 2, wherein the condition comprises at least one of a turn-off of a display, a charging in progress, or a rebooting state, and
   wherein the memory further stores instructions which, when executed by the at least one processor, cause the electronic device to, based on the condition being satisfied, update the first application based on the update package.

4. The electronic device of claim 1, wherein the memory further stores instructions which, when executed by the at least one processor, cause the electronic device to:
   identify, based on the expiration of the timer, that the at least one of the first application or the at least one related application is currently being executed, and provide, via a user interface, an operable control to receive a command for selecting whether to delay installing the update package.

5. The electronic device of claim 4, wherein the memory further stores instructions which, when execute by the at least one processor, cause the electronic device to display, through the user interface, an indication that the execution of the at least one of the first application or the at least one related application would be terminated by installing the update package.

6. The electronic device of claim 4, wherein the memory further stores instructions which, when executed by the at least one processor, cause the electronic device to, based on a delay in installing the update package being selected, display, through the user interface, an indication that updating the first application is being delayed.

7. The electronic device of claim 1, wherein the memory further stores instructions which, when executed by the at least one processor, cause the electronic device to:
   identify, based on the expiration of the timer, that the at least one of the first application or the at least one related application is currently being executed, and delay updating the first application by reconfiguring the timer.

8. The electronic device of claim 1, wherein the memory further stores instructions which, when executed by the at least one processor, cause the electronic device to:
   identify, based on the expiration of the timer, that the at least one of the first application or the at least one related application is not currently being executed, and update the first application based on the update package.

9. The electronic device of claim 1, wherein the memory is configured to store an activity record comprising a list of an application currently being executed, and
   wherein the memory further stores instructions which, when executed by the at least one processor, cause the electronic device to identify, based on the activity record, whether the at least one of the first application or the at least one related application is currently being executed.

10. The electronic device of claim 1, wherein the memory is configured to store a process record object configured to store information about a different application accessed or referenced by the first application, and wherein the memory further stores instructions which, when executed by the at least one processor, cause the electronic device to output, based on the process record object, the information about the different application as information about the at least one related application.

11. A method for operating an electronic device comprising:

receiving an update package of a first application from a server, based on a request to update the first application;

identifying at least one related application related to execution of the first application;

identifying whether the at least one of the first application or the at least one related application is currently being executed;

identifying whether the execution of the at least one of the first application or the at least one related application would be terminated by installing the update package;

based on identifying that the execution of the at least one of the first application or the at least one related application would be terminated by installing the update package, temporarily storing the update package in a memory and delaying updating the first application by using a timer; and based on an expiration of the timer, automatically installing the update package to update the first application.

12. The method of claim 11, further comprising:

identify, based on the expiration of the timer, whether the at least one of the first application or the at least one related application is currently being executed; and delaying updating the first application, based on identifying that the at least one of the first application or the at least one related application is currently being executed and a condition of the electronic device not being satisfied.

13. The method of claim 12, wherein the condition comprises at least one of a turn-off of a display, a charging in progress, or a rebooting state, and wherein the method further comprises updating the first application based on the update package, based on the condition being satisfied.

14. The method of claim 11, further comprising:

identifying, based on the expiration of the timer, that the at least one of the first application or the at least one related application is currently being executed, and providing, via a user interface, an operable control to receive a command for selecting whether to delay installing the update package.

15. The method of claim 14, further comprising:

displaying, through the user interface, an indication that the execution of the at least one of the first application or the at least one related application would be terminated by installing the update package.

16. The method of claim 14, further comprising:

based on a delay in installing the update package being selected, displaying, through the user interface, an indication that updating the first application is being delayed.

17. The method of claim 11, further comprising:

identifying, based on the expiration of the timer, that the at least one of the first application or the at least one related application is currently being executed, and delaying updating the first application by reconfiguring the timer.

18. The method of claim 11, further comprising:

identifying, based on the expiration of the timer, that the at least one of the first application or the at least one related application is not currently being executed, and updating the first application based on the update package.

19. The method of claim 11, further comprising:

storing an activity record comprising a list of an application currently being executed in the memory; and identifying, based on the activity record, whether the at least one of the first application or the at least one related application is currently being executed.

20. The method of claim 11, further comprising:

storing a process record object configured to store information about a different application accessed or referenced by the first application in the memory; and outputting, based on the process record object, the information about the different application as information about the at least one related application.

* * * * *